Dec. 8, 1964   R. F. LAEMMLE   3,160,175
CONDUIT CAP AND SPACER
Filed Oct. 2, 1961   3 Sheets-Sheet 1

*INVENTOR.*
RICHARD F. LAEMMLE
BY
MAHONEY, MILLER & RAMBO
BY Wm. V. Miller
ATTORNEYS Dec. 8, 1964    R. F. LAEMMLE    3,160,175
CONDUIT CAP AND SPACER Filed Oct. 2, 1961    3 Sheets-Sheet 2

*INVENTOR.*
RICHARD F. LAEMMLE
*BY*
MAHONEY, MILLER & RAMBO
BY *Wm. V. Miller*
ATTORNEYS Dec. 8, 1964 R. F. LAEMMLE 3,160,175
CONDUIT CAP AND SPACER
Filed Oct. 2, 1961 3 Sheets-Sheet 3

INVENTOR.
RICHARD F. LAEMMLE
BY MAHONEY, MILLER & RAMBO
BY
ATTORNEYS

United States Patent Office 3,160,175
Patented Dec. 8, 1964

3,160,175
CONDUIT CAP AND SPACER
Richard F. Laemmle, Grove City, Ohio, assignor to Rob-Ric Co., Worthington, Ohio, a corporation of Ohio
Filed Oct. 2, 1961, Ser. No. 142,355
2 Claims. (Cl. 138—96)

This invention relates to a conduit cap and spacer. It has to do, more particularly, with a cap for covering the exposed end of a conduit or pipe, such as one used in building construction, and for interlocking or interfitting with an identical cap and spacer on the end of an adjacent conduit or pipe.

As is well known, conduit and pipe, such as electrical conduit and water and gas pipe, are used in building construction and are commonly installed before pouring concrete around them in the floors and walls. The ends of the conduit are so disposed that they will protrude from the concrete after it is poured. They are usually installed in multiples of two or more. During the pouring of the concrete around the conduit, the ends thereof are usually crudely protected by cans slipped over the ends thereof, plugs of various materials forced into the ends thereof, or wrappings around the ends thereof.

The present invention deals with a cap and spacer which can be slipped easily over the end of a conduit and removed easily therefrom, which not only will protect the end of the conduit from damage and entrance of foreign material, but which will also interlock with an identical spacer on adjacent conduit to maintain the conduits in predetermined spaced relationship.

The cap and spacer of this invention is preferably made of plastic so that it can be manufactured in quantity at a relatively low cost and all the caps will be identical so that any cap will readily interlock with an adjacent cap as well as properly fit on the conduit for which it is designed. Furthermore, the interlocking structure is so designed that it will not tend to separate under force.

In the accompanying drawings examples of the articles of this invention are illustrated but it is to be understood that specific details of the article can be varied without departing from basic principles.

Figure 1:
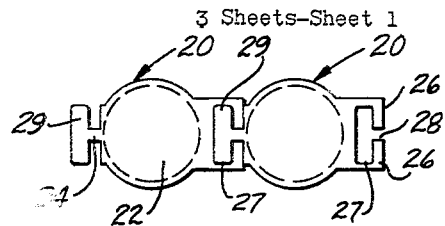
FIGURE 1 is a plan view showing two of the caps and spacers of this invention in interlocking relationship.

With reference to the drawings, the preferred form of the article of this invention is illustrated in FIGURES 1, 2, and 4 to 8. As indicated previously, it is preferably formed of plastic so that it can be readily molded and all the articles will be practically identical. The article comprises an inverted cup-shaped body 20 which has a tubular or cylindrical socket 21 formed therein. This socket is open at its lower end and its upper end is closed, or at least closed to the entrance of concrete, by a disc-like cap portion 22 which is integral with the body. The annular lower open mouth 23 of the socket is adapted to slip over the end of a conduit of annular cross section and the socket 21 will snugly receive the size conduit for which it is designed.

Along one side of the body 20 and extending the full height thereof is an integral vertical rib 29 which in this example is of T-cross section. It comprises a connecting vertical web 24 which is radially disposed relative to the body and an outer relatively heavy section 25 which is rectangular in cross section and is transversely disposed relative to the web section 24. At its diametrically opposite side the body 20 has L-shaped vertical flanges 26 formed integrally thereon throughout the height thereof. These flanges cooperate to produce a vertical groove or socket 27 of rectangular cross section complemental to the rib 25 which it is designed to receive. The flanges are spaced to provide the longitudinal slot 28 for receiving the web 24. The groove or socket 27 and the connected slot 28 are open at both their upper and lower ends.

Various size articles may be provided for use on various size conduits. However, although the conduit-receiving sockets 21 will vary in size, depending on the diameters of the conduits to be received, the interlocking rib and groove will always be standard. This is desirable, since quite frequently adjacent conduits are of different size.

Figure 3:
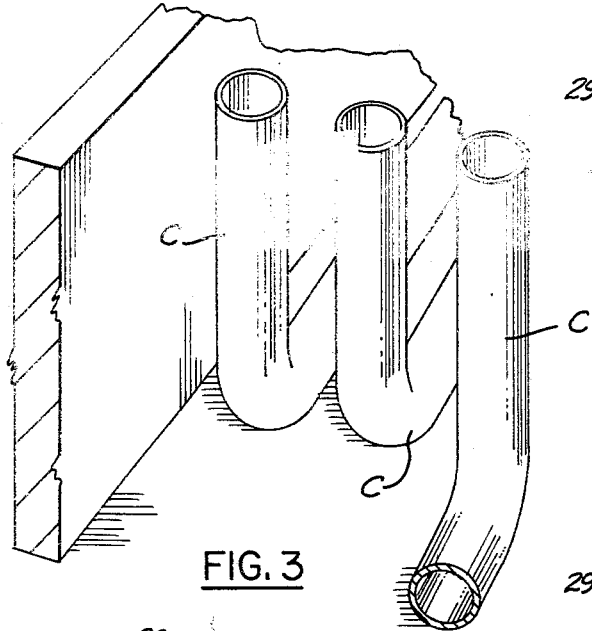
FIGURE 3 is a perspective view illustrating three adjacent spaced conduits to be embedded in concrete and to the ends of which the caps and spacers may be applied.
Figure 2:
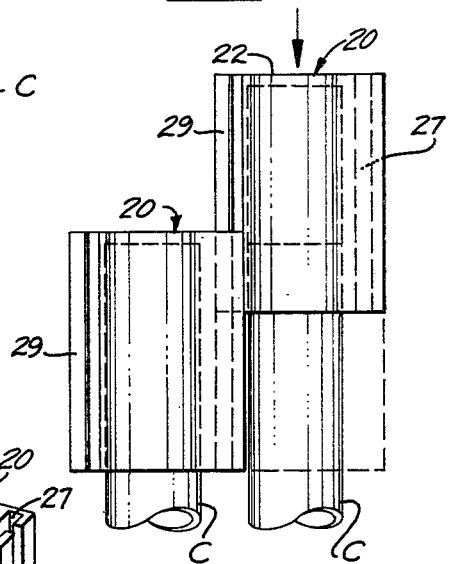
FIGURE 2 is a side elevational view showing one of the caps in place on the end of a conduit and a second being slipped onto the end of an adjacent conduit in interlocking or interfitting relationship thereto.
Figure 4:
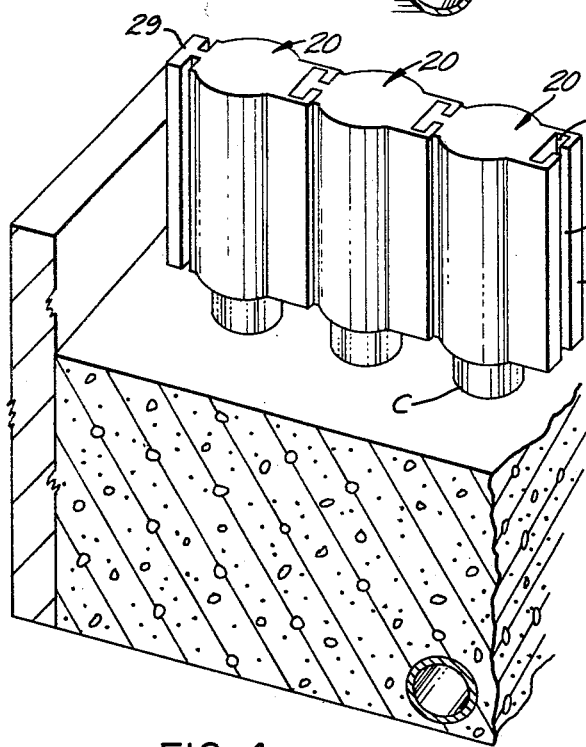
FIGURE 4 is a similar view showing the concrete poured after the ends of the conduits have been protected by three interlocking caps and spacers of this invention.

The manner in which the caps and spacers are used is illustrated best in FIGURES 2 to 4. Assuming there are three conduits C disposed side-by-side as shown in FIGURE 3 and these conduits are to be partially enclosed in concrete with their ends protruding, three of the caps are adapted to be slipped on the ends thereof into the positions shown in FIGURE 2. This is accomplished as indicated in FIGURE 2, the first cap being slipped into position on one of the conduits and then the second and third being slipped onto the other conduits sequentially. As the following cap is slipped in place, its locking or guide rib 25 is slipped into the guide groove or socket 27 as indicated in FIGURE 2. The lowermost positions of all the caps will be the same, since the cap portions 22 will cooperate with the upper extremities of the conduits as stops. However, slight variations in the level of the upper ends of the conduits will have no adverse effect on the interlocking of adjacent caps. Thus, the ends of the conduit will not only be covered but they will be held in predetermined spaced relationship by the interlocking rib and groove or socket structures of adjacent caps. The caps may be used in any desired multiples. As the concrete is poured, the ends of the conduit are protected. When the pouring is completed, the caps may be slipped from the ends of the conduits and be used in other locations. They can be cleaned and be used over and over again.

Figure 5:
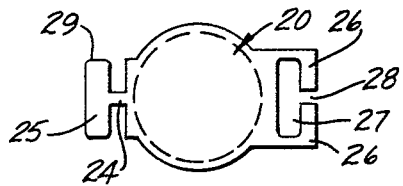
FIGURE 5 is a plan view of one of the spacers.
Figure 6:
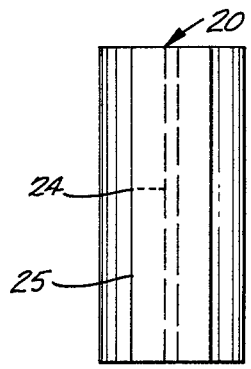
FIGURE 6 is an elevational view of the rib side of the article.
Figure 7:
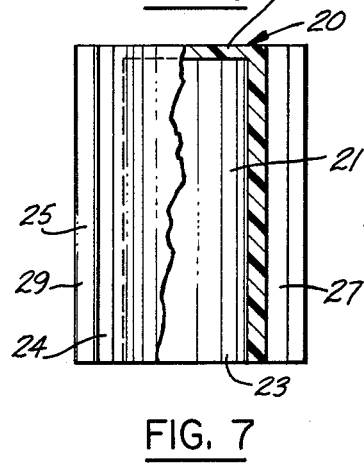
FIGURE 7 is a side elevational view, partly broken away, taken at right angles to that of FIGURE 6.
Figure 8:
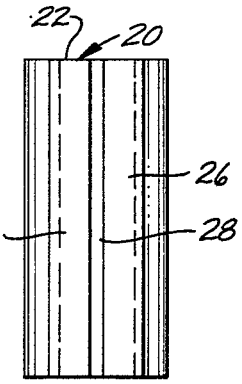
FIGURE 8 is a view similar to FIGURE 6 but taken at the opposite or groove side of the article.
Figure 9:
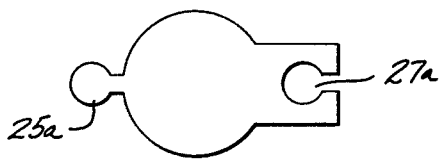
FIGURES 9 to 12 are schematic plan views showing various shapes of interlocking ribs and grooves on the articles.
Figure 10:
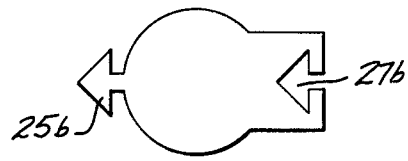
Figure 11:
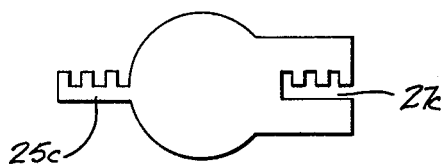
Figure 12:
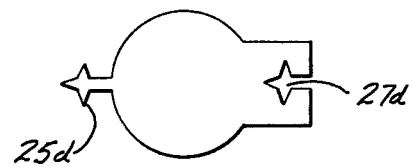

The shape of interlocking rib and socket illustrated in FIGURE 5 is preferred as this rectangular cross section effectively resists pulling of one rib radially out through the slot 28 of a cooperating cap. However, other shapes such as those illustrated in FIGURES 9 to 12 may be utilized. For example, the rib 25a and complemental socket or groove 27a of FIGURE 9 are of circular cross section and the ribs 25b and socket or groove 27b of FIGURE 10 are of triangular cross section. In FIGURE 1, the rib 25c and socket or groove 27c are complemental serrated cross section. The rib 25d and complemental socket or groove 27d of FIGURE 12 are star-shaped in cross section. Many other forms of interlocking ribs and sockets may be provided.

Figure 13:
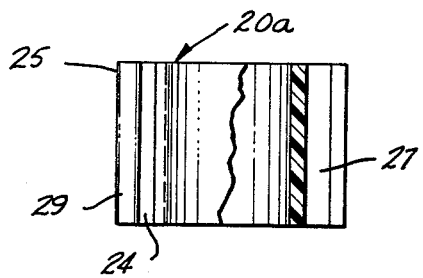
FIGURE 13 is a view similar to FIGURE 7 but showing a spacer sleeve which can be slipped over the end of a conduit.
Figure 14:
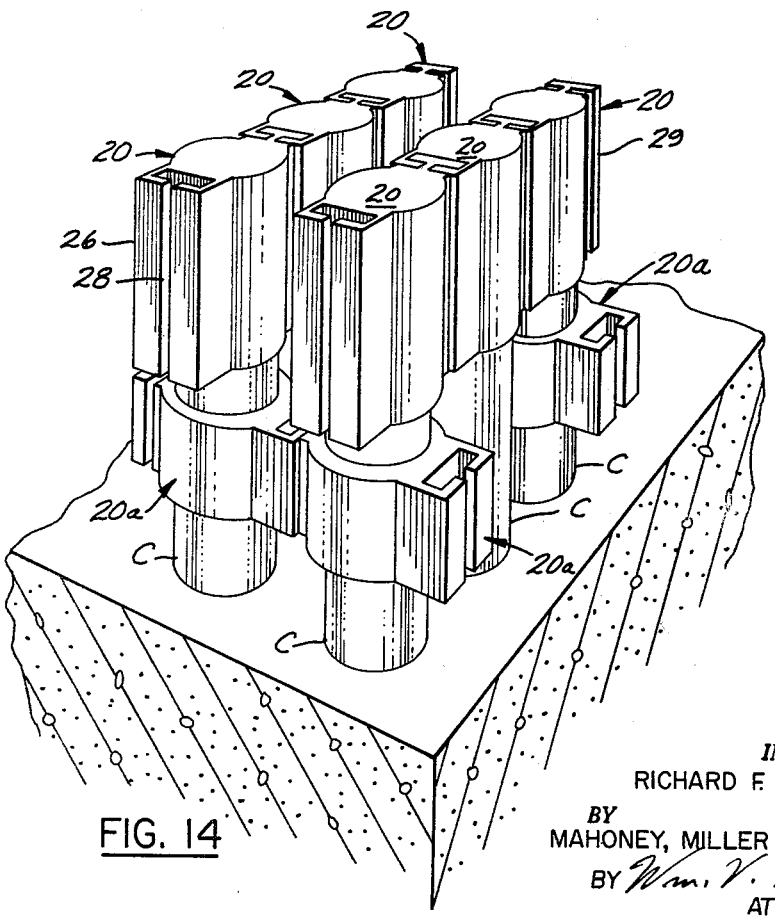
FIGURE 14 is a diagrammatic view illustrating how the spacer sleeve of FIGURE 13 can be used in conjunction with the combination caps and spacers.

In some instances it may be desirable to use a spacer sleeve of the type shown in FIGURE 13. Thus, sleeve 9a will be identical with the cap and spacer previously described but will not have the cap portion 22. Thus, it will function merely as a spacer and not as a cover. It can be used as indicated in FIGURE 14 where two rows of conduits are shown. Two of the spacers will be slipped downwardly over the ends of the two conduits at each end of the two rows. The caps and spacer articles are used on each conduit exactly as before and interlock with each other so snugly as to prevent relative displacement laterally of each row as well as longitudinally thereof. Thus, the rows of conduits will be spaced and the conduits of each row will be spaced. The spacers and the combination caps and spacers may be used in other arrangements.

It will be apparent from the above description that this invention provides a novel, effective and inexpensive cap and spacer which is particularly useful on the ends of conduits to be exposed after concrete or similar material poured around the conduits.

Various other advantages will be apparent.

Having thus described this invention, what is claimed is:

1. A spacer for use on a conduit comprising a body having a conduit-receiving socket which is of a cross section complemental to and of a size to receive the conduit, said socket having a peripheral wall which will surround the conduit and the inner surface of which will engage the outer peripheral surface of the conduit, said peripheral wall having a longitudinally extending rib at one side thereof comprising a heavy portion joined to the wall by a thinner web, and a longitudinally extending rib-receiving spacer and socket portion on the peripheral wall at the opposite side of said body, said rib-receiving spacer and socket portion having a large socket extending longitudinally thereof open at its end and being complemental to said rib heavy portion so that its end can be slipped into the end of the large socket, said socket being spaced laterally outwardly of the surface of the peripheral wall of the body by a spacer section, said rib-receiving spacer and socket portion having an outer slot opposite the spacer section communicating with said socket and extending longitudinally thereof and having an open end for receiving the end of said web.

2. In combination with a plurality of laterally spaced conduit ends, a plurality of spacers slipped over said conduit ends, each of said spacers comprising a body having a conduit-receiving socket which is of a cross section complemental to and of a size to receive the cooperating conduit, said socket having a peripheral wall which surrounds the conduit and the inner surface of which engages the outer peripheral surface of the conduit, said peripheral wall having a longitudinally extending rib at one side thereof comprising a heavy portion joined to the wall by a thinner web, and a longitudinally extending rib-receiving spacer and socket portion on the peripheral wall at the opposite side of said body, said rib-receiving spacer and socket portion having a large socket extending longitudinally thereof open at its end and being complemental to said rib heavy portion so that its end can be slipped into the end of the large socket, said socket being spaced laterally outwardly of the surface of the peripheral wall of the body by a spacer section, said rib-receiving spacer and socket portion having an outer slot opposite the spacer section communicating with said socket and extending longitudinally thereof and having an open end for receiving the end of said web, said web being positioned in said socket so that adjacent bodies are not only joined together but are spaced a predetermined distance laterally from each other.

References Cited by the Examiner
UNITED STATES PATENTS

| 1,736,122 | 11/29 | La Duke | 220—42 |
| 2,520,203 | 8/50 | Haywa | 220—23.4 |
| 2,706,499 | 4/55 | Grable | 138—89 |
| 2,914,832 | 12/59 | Lee. | |
| 2,949,204 | 8/60 | Edwards | 220—23.4 |

FOREIGN PATENTS

| 1,099,180 | 3/55 | France. |
| 1,211,229 | 10/59 | France. |
| 846,602 | 8/60 | Great Britain. |

EDWARD V. BENHAM, *Primary Examiner.*